United States Patent
Stark et al.

(10) Patent No.: US 9,934,164 B2
(45) Date of Patent: *Apr. 3, 2018

(54) MEMORY WRITE PROTECTION FOR MEMORY CORRUPTION DETECTION ARCHITECTURES

(71) Applicant: INTEL CORPORATION, Santa Clara, CA (US)

(72) Inventors: Tomer Stark, Nesher (IL); Ron Gabor, Hertzliya (IL); Ady Tal, Zichron Yaacove (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,977

(22) Filed: Mar. 16, 2017

(65) Prior Publication Data

US 2017/0185535 A1    Jun. 29, 2017

Related U.S. Application Data

(63) Continuation of application No. 14/745,172, filed on Jun. 19, 2015, now Pat. No. 9,619,313.

(51) Int. Cl.
*G06F 11/00* (2006.01)
*G06F 12/14* (2006.01)
*G06F 12/02* (2006.01)
*G06F 11/07* (2006.01)

(52) U.S. Cl.
CPC ........ *G06F 12/1425* (2013.01); *G06F 11/073* (2013.01); *G06F 11/0751* (2013.01); *G06F 12/0238* (2013.01); *G06F 2212/1032* (2013.01)

(58) Field of Classification Search
CPC .............. G06F 11/073; G06F 11/0751; G06F 11/0772; G06F 11/07; G06F 11/0787
See application file for complete search history.

(56) References Cited

U.S. PATENT DOCUMENTS

| | | | |
|---|---|---|---|
| 7,930,491 | B1 | 4/2011 | Xu et al. |
| 8,510,596 | B1 | 8/2013 | Gupta et al. |
| 9,652,375 | B2 | 5/2017 | Stark et al. |
| 2007/0055837 | A1 | 3/2007 | Rajagopal |

(Continued)

FOREIGN PATENT DOCUMENTS

EP    0652515 A1    5/1995

OTHER PUBLICATIONS

International Search Report and Written Opinion for International Patent Application No. PCT/US2016/014180, dated Jul. 11, 2016, 15 pages.

*Primary Examiner* — Charles Ehne
(74) *Attorney, Agent, or Firm* — Lowenstein Sandler LLP

(57) ABSTRACT

Memory corruption detection technologies are described. A system on a chip (SoC) may include a memory device and a memory controller. The memory device may store data from an application, wherein the memory device comprises a memory corruption detection (MCD) table. The memory controller may be coupled to the memory device. The memory controller may allocate a contiguous memory block in the memory and write a MCD word into the MCD table. The MCD word may include a write protection indicator that indicates a protection mode of a first portion of the contiguous memory block.

20 Claims, 13 Drawing Sheets

(56) References Cited

U.S. PATENT DOCUMENTS

| | | |
|---|---|---|
| 2007/0136385 A1 | 6/2007 | Abrashkevich et al. |
| 2008/0320336 A1 | 12/2008 | Qadir et al. |
| 2009/0249289 A1 | 10/2009 | Akritidis et al. |
| 2010/0162038 A1 | 6/2010 | Hulbert |
| 2011/0145536 A1 | 6/2011 | Zachmann |
| 2011/0145632 A1 | 6/2011 | Waldspurger |
| 2011/0173399 A1 | 7/2011 | Chen et al. |
| 2012/0131257 A1 | 5/2012 | Rudosky et al. |
| 2012/0137167 A1 | 5/2012 | Leischner et al. |
| 2013/0013843 A1* | 1/2013 | Radovic ................ G06F 11/073 711/5 |
| 2013/0024631 A1 | 1/2013 | Balasubramanian |
| 2013/0036332 A1 | 2/2013 | Gove et al. |
| 2013/0097356 A1 | 4/2013 | Dang et al. |
| 2013/0173954 A1 | 7/2013 | Woo et al. |
| 2013/0283105 A1 | 10/2013 | Balasubramanian |
| 2013/0318322 A1 | 11/2013 | Shetty |
| 2013/0318405 A1 | 11/2013 | Korah |
| 2014/0115283 A1 | 4/2014 | Radovic et al. |
| 2014/0122826 A1 | 5/2014 | Jacob et al. |
| 2014/0173356 A1 | 6/2014 | Burghard et al. |
| 2014/0281336 A1 | 9/2014 | Solihin |
| 2015/0106588 A1 | 4/2015 | Godard et al. |
| 2015/0127972 A1 | 5/2015 | Chun et al. |
| 2015/0278103 A1 | 10/2015 | Radovic et al. |
| 2016/0124802 A1* | 5/2016 | Gabor ................ G06F 11/1004 714/807 |
| 2016/0259682 A1* | 9/2016 | Stark .................. G06F 11/1064 |
| 2016/0283300 A1 | 9/2016 | Stark |

\* cited by examiner

MEMORY WRITE PROTECTION FOR MEMORY CORRUPTION DETECTION ARCHITECTURES

RELATED APPLICATION

This application is a continuation of U.S. patent application Ser. No. 14/745,172, filed Jun. 19, 2015, the entire disclosure of which is incorporated herein by reference.

BACKGROUND

Memory corruption can be a major resource issue leading to system malfunctions and can negatively impact performance of a system. Memory corruption can arise from a variety of causes, including: programming errors, out-of-bound accesses, dangling pointers, and malicious attacks on memory. Use of corrupted memory content in a computer program may cause the computer program to crash or to act abnormally. Software solutions may be used for memory corruption detection, such as debugging tools. However, the software solutions may cause a computer program to run significantly slower and can be difficult to use in debugging the computer program.

DESCRIPTION OF EMBODIMENTS

Figure 1:
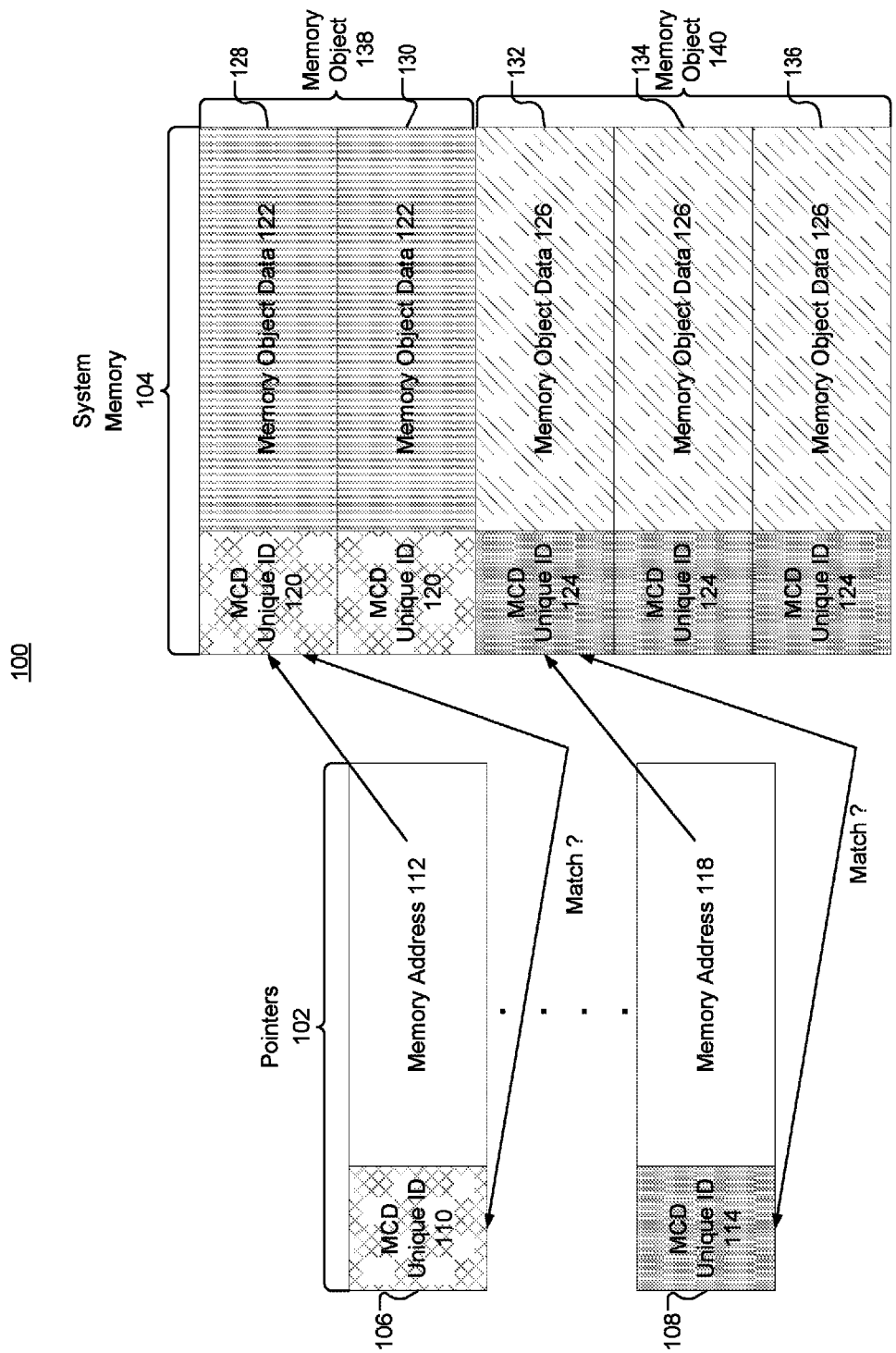
FIG. 1 illustrates a memory corruption detection (MCD) system according to one embodiment.

Memory corruption can occur when the contents of a memory location are accessed. The contents in the memory location can be unintentionally accessed because of programming errors or intentionally modified because of a malicious attack. There can be a variety of causes of memory corruption. One cause of memory corruption can be a coding error, where an application erroneously writes into or reads from unintended memory blocks of a system memory. Another cause of memory corruption can be when an application uses an invalid pointer to write data into a memory block that has been freed. Another cause of memory corruption can be when an application attempts to write data into a memory block header (or other restricted or reserved memory regions) that may be managed by an operating system (OS) of an electronic device. A variety of other causes of memory corruption may exist.

Use of corrupted memory can lead to data corruption (e.g. database system corrupted content), memory management problems, and cause performance degradation, unpredictable program execution, or program crashes. In one example, A pointer can store an ID number and the ID number of the pointer can be compared to an ID number maintained in a memory cache to check that the ID numbers match. However, the ID numbers are associated with pages in memory and may not protect against data writes to memory at a sub-page granularity.

Embodiments described herein may address the above noted deficiency by using an MCD architecture with memory write protection using coherent memory metadata. The MCD architecture can include a metadata table with a MCD unique identifier (such as a MCD color) and/or a write protection indicator. The MCD architecture can also include a processor or a software library executed by the processor (such as an allocation library) to setup or allocate MCD metadata words. Additionally, the MCD architecture can check when a loading or storing of data may be write protected (such as at a byte level granularity) using the MCD metadata words. An advantage of the MCD architecture can be that applications can define write-protection for application data without OS or VMM intervention or services. For example, an application can write protect sub-page level objects (such as individual pointers or byte level objects) without using OS or VMM services. The MCD architecture can use metadata to check that a store command may be accessing non-write protected memory. Write protected sub-page level memory can provide added security against possible starting points of malicious attacks.

The MCD architecture can attach metadata to fixed sized blocks of N bytes (such as 64 byte blocks). The metadata can be used to catch data corruption bugs as well as prevent writing to specific areas of memory at a subpage granularity. Applications can use the write protection in a variety of situations, including: protecting an objects' metadata or allocation metadata, protecting linked-list pointers, and protecting a function's return address on a stack.

Heap memory is an area of reserved memory that a program or application can use to store data in a variable amount. The heap memory may be used when the program or application is running. For example, an application may receive different amounts or types of data for processing (such as from different users) and store the data in the heap memory. The application can process the different amounts or types of data as the application may be running. An allocation library executed by a processor can be used for memory allocations, freeing of memory, and memory corruption detection (MCD) data management. To prevent incidents of the memory corruption, a processing system or processor may be operable to validate pointers produced by memory access instructions of applications being executed by the processing system or processor. In one example, the processing system may maintain a metadata table that stores identifiers for different allocated buffers (e.g., memory allocations), including one or more contiguous memory blocks of a system memory. In another example, the contiguous memory blocks of the system memory can be a same pre-defined size, such as 64 bytes (B) or 32 B. In another example, the contiguous memory blocks of the system memory can different sizes.

When a portion of memory of the processor may be allocated for a newly created memory object, a unique identifier (ID) may be generated and associated with one or more contiguous memory blocks that can store data written to the memory object. The unique identifiers for the contiguous memory blocks may be MCD unique IDs or MCD color designations. For example, contiguous memory blocks allocated for a memory object can be assigned a MCD color value, such as a 6 bit metadata value.

The MCD unique identifiers for different memory objects may be stored in one or more MCD table entries of a MCD table that correspond to the contiguous memory blocks being allocated for the memory objects. An MCD unique identifier may also be stored in one or more bits (e.g., upper bits) of a pointer that can be returned by a memory allocation routine to an application that has requested a memory allocation. When the processor receives a memory store request, the processor may compare a MCD unique identifier retrieved from the MCD table to a MCD unique identifier extracted from the pointer specified by the memory store request. When the MCD unique identifiers do not match, a fault may be generated.

FIG. 1 illustrates a MCD system 100 according to one embodiment. The MCD system 100 can include pointers 102 and a system memory 104. The pointers 102 can include a MCD unique ID field or a MCD color value field and a memory address field. For example, pointer 106 can include a MCD unique ID 110 and a memory address 112 and pointer 108 can include a MCD unique ID 114 and a memory address 118. The MCD unique IDs 110 and 114 can be stored in one or more bits (such as upper bits, which may not be part of a linear address) of the pointers 106 and 108, respectively. The memory addresses 112 and 118 can reference beginning address locations of memory objects 138 and 140 in the system memory 104. For example, memory address 112 can reference an address location to contiguous memory block 128 and memory address 118 can reference an address location to contiguous memory block 132. The memory objects 138 and 140 can include one or more contiguous memory blocks. For example, memory object 138 can include contiguous memory blocks 128 and 130 and memory object 140 can include contiguous memory blocks 132, 134, and 136. When a portion of the system memory 104 may be allocated to newly created memory objects 138 and 140 for memory object data 122 and 126, a memory allocation routine (e.g., by a calloc routine, a malloc routine, or a realloc routine) may generate MCD unique IDs 120 and 124 to be associated with the contiguous memory blocks 128-130 and 132-136, respectively.

The MCD system 100 may receive a memory store instruction from an application requesting to store data in a contiguous memory block. For example, MCD system 100 may receive a memory store instruction, where the memory store instruction includes the pointer 106 with a memory address 112 indicating a beginning location of the object data 122 at contiguous memory block 128. When executing the memory store instruction, the MCD system 100 can compare the MCD unique ID 110 of the pointer 106 with the MCD unique ID 120 associated with the contiguous memory block 128. When the MCD unique ID 110 matches the MCD unique ID 120, the MCD system 100 may store the object data 122. The MCD system 100 can iterate through the contiguous memory blocks 128 and 130 of memory object 138 to find a match until the MCD system 100 reaches the contiguous memory block 132. The MCD system 100 can determine that it has reached the end of the contiguous memory blocks 128 and 130 when the MCD unique ID 124 does not match the MCD unique ID 110. When the MCD unique ID 124 does not match the MCD unique ID 110, the MCD system 100 may generate a fault message (such as an exception) indicating that the end-of-memory object 138 has been reached.

Figure 2:
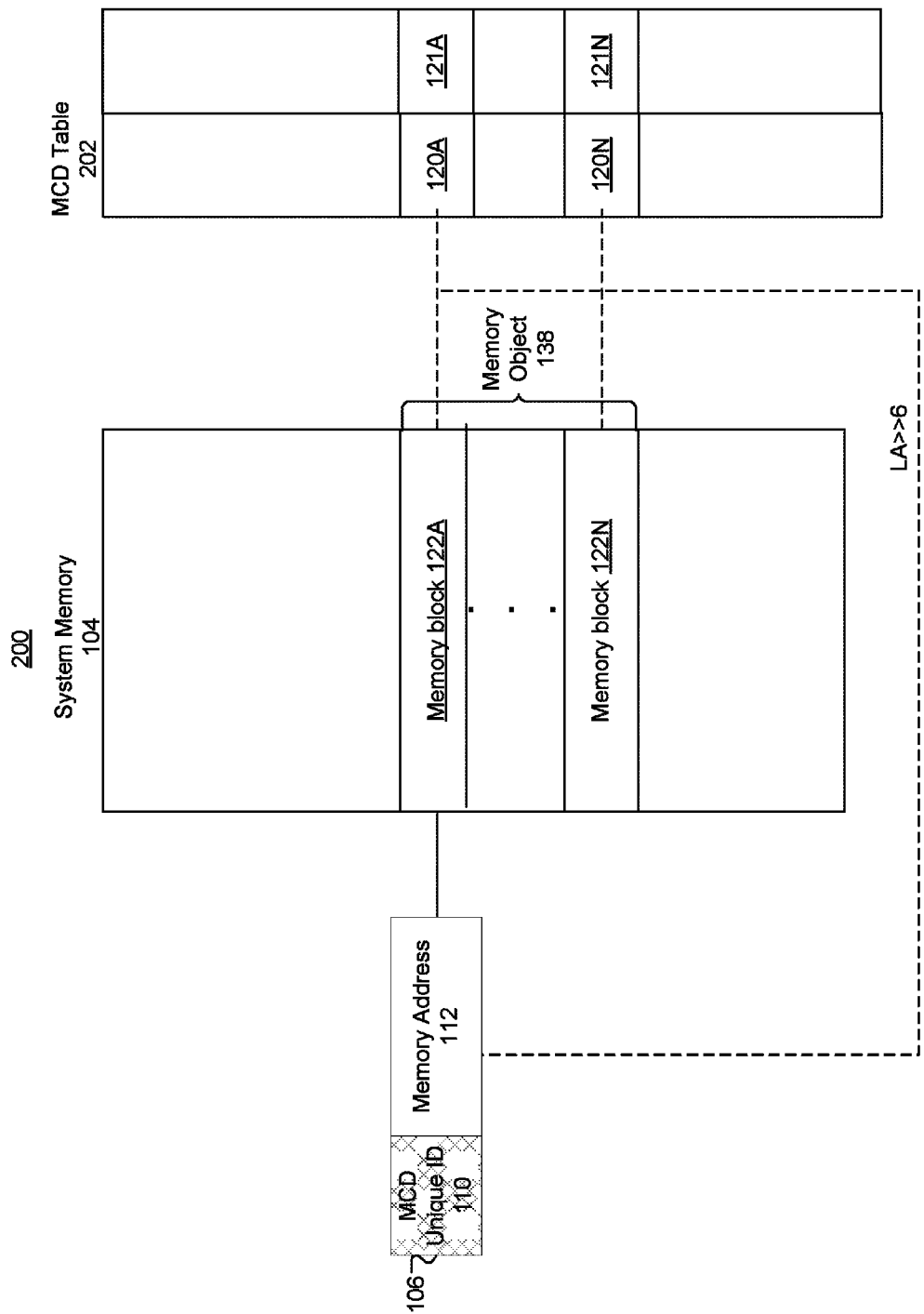
FIG. 2 illustrates an architecture of an MCD system with a system memory and a MCD table according to one embodiment.

FIG. 2 illustrates an architecture of an MCD system 200 with a system memory 104 and a MCD table 202 according to one embodiment. The MCD system 200 can include a pointer 106 with an MCD unique ID 110 and a memory address 112 referencing a memory object 138. The memory object 138 can include contiguous memory blocks 122A-122N. The MCD table 202 may include MCD unique IDs 120A-120N and MCD border values 121A-121N associated with the contiguous memory blocks 122A-122N, respectively. The MCD unique IDs 120A-120N and the MCD border values 121A-121N can be stored at offsets derived from the base addresses of the corresponding contiguous memory blocks 122A-122N.

Figure 3:
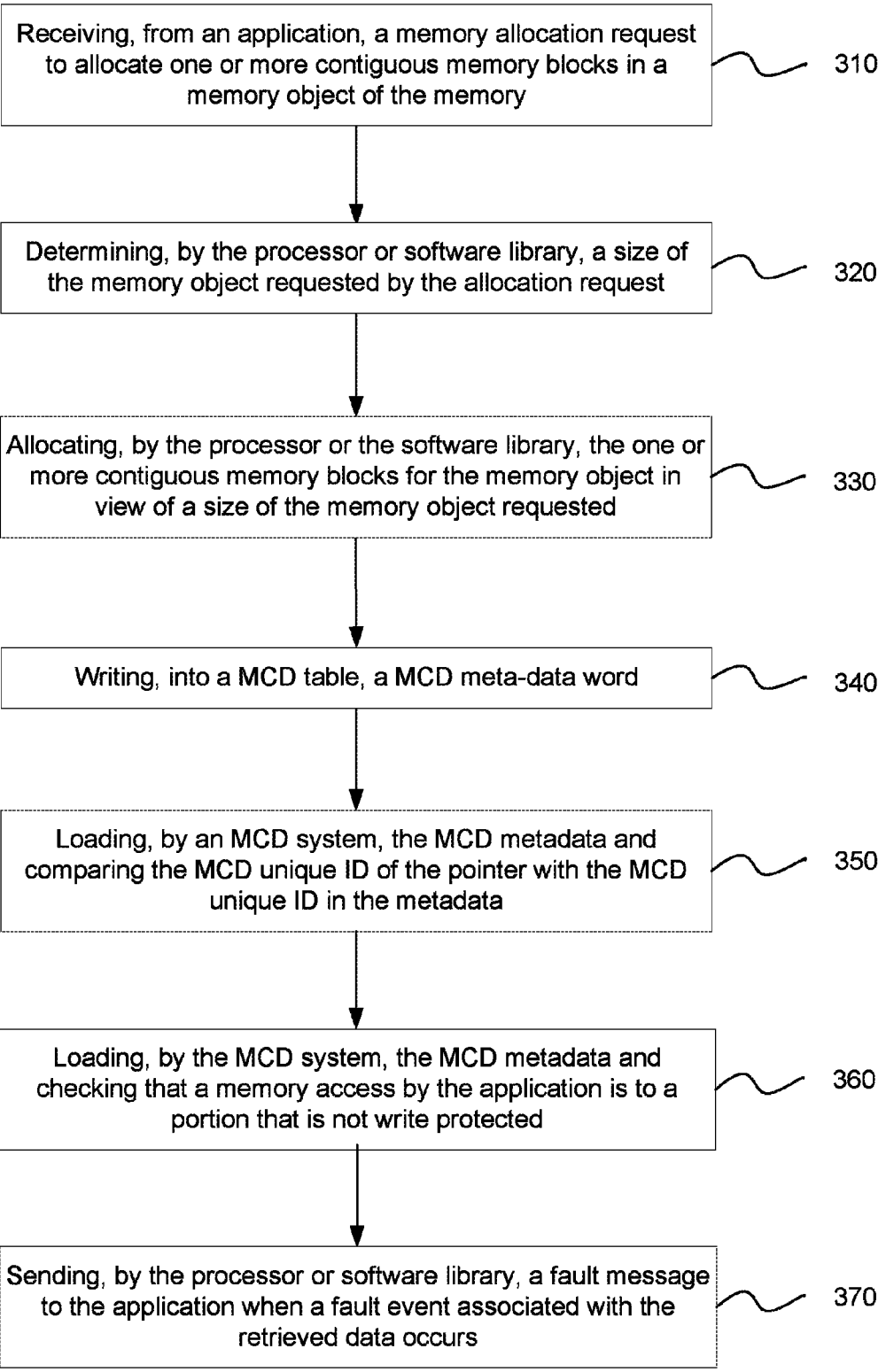
FIG. 3 depicts a flow diagram of a method for encoding which bytes cannot be written to within a memory block according to one embodiment.

FIG. 3 depicts a flow diagram of a method 300 to encode which bytes cannot be written to (e.g. write protected) within a memory block according to one embodiment. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its functions, routines, subroutines, or operations may be performed by one or more physical processors of the computer system executing the method. Two or more functions, routines, subroutines, or operations of method 300 may be performed in parallel or in an order which may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

Referring to FIG. 3, the method 300 may begin with a processor or software library (such as a runtime library) executed by the processor receiving, from an application, a memory allocation request to allocate one or more contiguous memory blocks in a memory object of the memory (block 310). The memory object can be a contiguous portion of the memory that includes one or more memory blocks (such as contiguous memory blocks). In one example, the processor or library can receive the allocation request when the application begins or may be initiated (e.g., an initial allocation request of memory from the application). In another example, the processor or software library can receive the allocation request while the application may be running (e.g., a subsequent allocation request of memory from the application). In one embodiment, each memory block, such as 1 byte blocks of an 8 byte memory object, can be protected by a single bit. In this embodiment, the memory object can be 8 bytes because programming language, such as C and C++ programming languages, may align addresses of objects and pointers in structures to 8 bytes. Sizes of the memory objects and/or the memory blocks are not intended to be limiting and the memory objects and/or memory blocks can be any size set by the software library of the processor or a MCD system.

The method can further include, determining, by the processor or software library, a size of the memory object requested by the allocation request, such as an amount of bytes (N bytes) of memory (block 320). In one example, the memory object can be broken down into fixed block sizes of memory (e.g., contiguous memory blocks). For exemplary purposes in the proceeding paragraphs, it can be assumed that the memory blocks may be 64 B of contiguous memory. However, the memory block size of 64 B is not intended to be limiting and the memory block sizes can be any size set by the allocation library or the MCD system.

In one example, the software library can determine a size of memory being requested based on allocation size information included in the allocation request. The method can include allocating, by the processor or the software library, the one or more contiguous memory blocks for the memory object in view of a size of the memory object requested (block 330). In one example, a memory block can be 64 bytes and the processor or software library can divide the 64 bytes into 4 portions of 16 bytes each or 8 portions of 8 bytes each. A pointer can indicate a location of a portion in the memory block to store the data. The method can also include writing, into a MCD table, a MCD metadata word (block 340). In one example, for allocation sizes that are greater than the MCD block (e.g. 64 B), the MCD metadata word may be written into the MCD table for each memory block. The MCD metadata word can include a first byte with a MCD unique ID (such as a MCD color) that can be 6 bits, a mode indicator (1 bit) for the second byte, and a reserved bit for other extensions. The mode indicator for the second byte can designate whether a second byte of the MCD word includes byte level granularity information or the second byte includes write protection information. For example, the MCD metadata word can include the second byte with byte level granularity detection information or a mask of which portions inside that memory block are write protected, or a combination of both. In this example, when the mode indicator for the second byte is 0 then the mode indicator can designate the second byte as including byte level information and when the mode indicator for the second byte is 1 then the mode indicator can designate the second byte as including write protection information. In one example, the application can indicate which portions in the block are write protected. In one embodiment, the application can indicate which portions in the block are write protected before the memory block may be allocated. In another embodiment, the application can indicate which portions in the block are write protected after the memory block may be allocated.

The method can include loading, by an MCD system, the MCD metadata and comparing the MCD unique ID of the pointer with the MCD unique ID in the metadata (block 350). The method can also include loading, by the MCD system, the MCD metadata and checking that a memory access by the application is to a portion that is not write protected (block 360). The method can include sending, by the processor or software library, a fault message to the application when a fault event associated with the retrieved data occurs (block 370). In one example, the fault event may occur when an MCD unique ID mismatch occurs. In another example, the fault event may occur when a store command indicates to store data in a write protected region within the memory block.

Figure 4A:
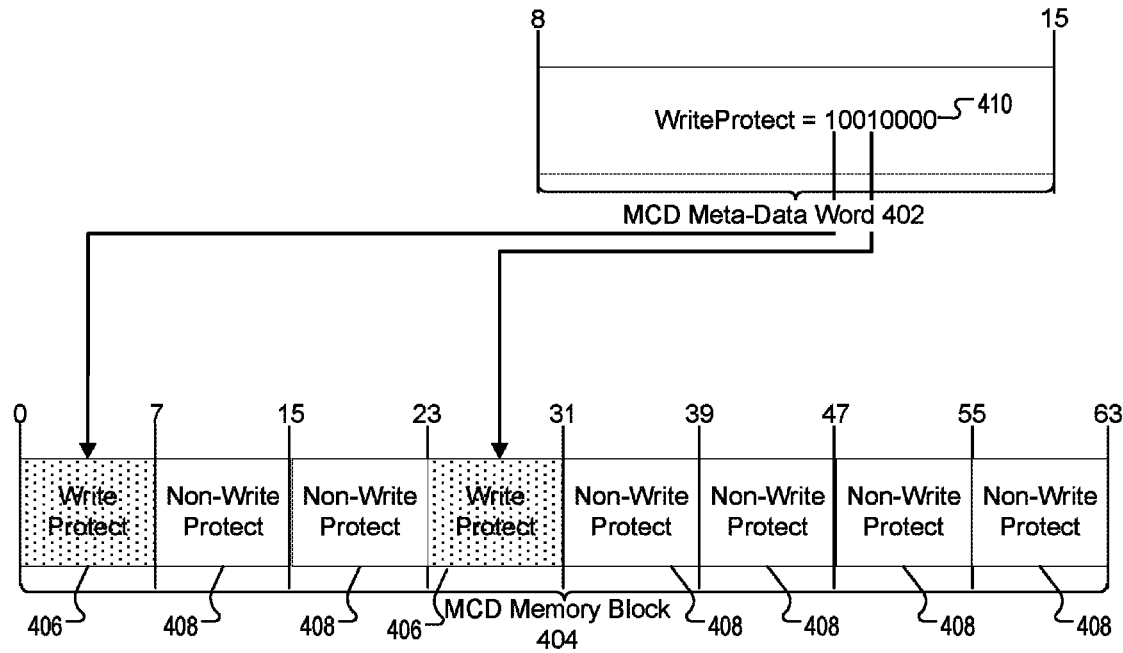
FIG. 4A illustrates a MCD metadata word with a write protection encoding for a MCD memory block according to one embodiment.

FIG. 4A illustrates a MCD metadata word 402 with a write protection encoding for a MCD memory block 404 according to one embodiment. For exemplary purposes in the proceeding paragraphs, it can be assumed that the MCD memory block 404 is 64 B of contiguous memory. However, the memory block size of 64 B is not intended to be limiting and the memory block sizes can be any size set by an allocation library of the processor or a MCD system. The MCD memory block 404 can be divided into a 64 byte MCD block of memory with 8 portions of 8 bytes. The MCD metadata word 402 can use 8 bits to indicate which of the 8 portions are write protected. For example, the MCD metadata word 402 can include a write protection indicator 410 that has a binary code of 10010000, where the is indicate that associated portions 406 of the MCD memory block 404 are in a write protection mode (e.g., write protected) and the 0s indicate that associated portions 408 of the MCD memory block 404 are in a non-write protection mode (e.g., non-write protected).

Figure 4B:
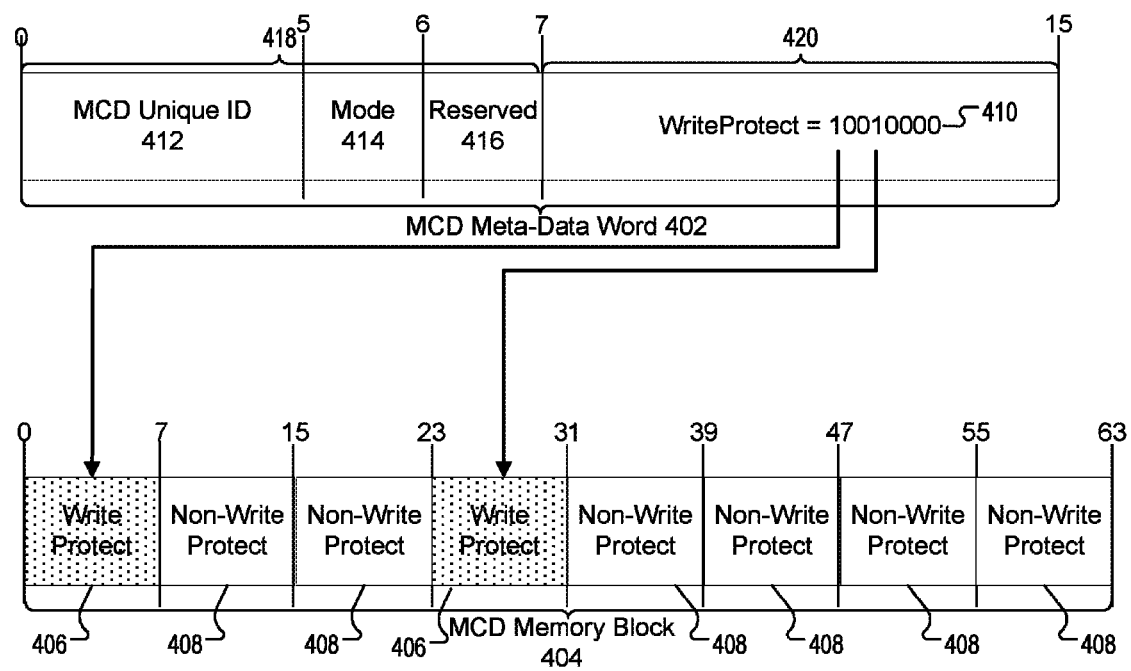
FIG. 4B illustrates the MCD metadata word with a first byte and a second byte according to one embodiment.

FIG. 4B illustrates the MCD metadata word 402 with a first byte 418 and a second byte 420 according to one embodiment. The first byte 418 can include a MCD unique ID 412, a mode indicator 414, and a reserve bit 416. The second byte 420 can include a write protection indicator 410 that has a binary code of 10010000, where the is indicate that the associated portions 406 of the MCD memory block 404 are write protected and the 0s indicate that the associated portions 408 of the MCD memory block 404 are non-write protected. In one example, the 64 B MCD memory block 404 can be divided into 4 portions of 16 bytes and the MCD metadata word 402 can use 4 bits to denote which of the 4 portions are write protected. The 4 bits can be coupled with the MCD unique ID 412. In another example, the 64 byte MCD memory block 404 can be divided into a 32 bytes MCD block of memory with 4 portions of 8 bytes and the MCD metadata word 402 can use 4 bits to denote which of the 4 portions are write protected. The 4 bits can be coupled with the MCD unique ID 412. In another example, any granularity of write protection can be applied when the MCD metadata word 402 may be extended to have a bit per portion.

In one example, the application can select which portions to mark as write protected, and set the MCD metadata word accordingly. The application can create a proprietary allocation for specific objects, for which the application indicates which portions are to be marked as write protected, such as protecting allocation metadata.

Figure 4C:
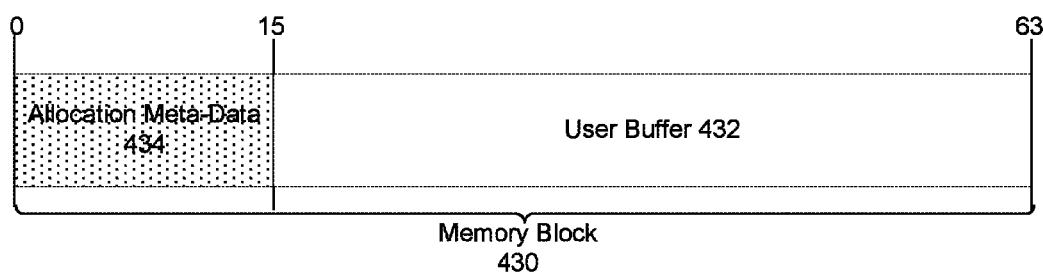
FIG. 4C illustrates a memory block of an allocation library with metadata marked as write protected according to one embodiment.

FIG. 4C illustrates a memory block 430 of an allocation library with metadata marked as write protected according to one embodiment. The allocation library, such as a GNU C library or glibc, can store allocation metadata 434 (e.g., not MCD metadata) in a heap, such as 16 bytes before a user buffer or return pointer 432. The allocation library could mark the allocation metadata 434 as write protected. The allocation library can mark the metadata in the allocation metadata 434 as write protected to prevent a user from accidently or maliciously overwriting the metadata but still allowing the user to read the metadata.

Figure 4D:
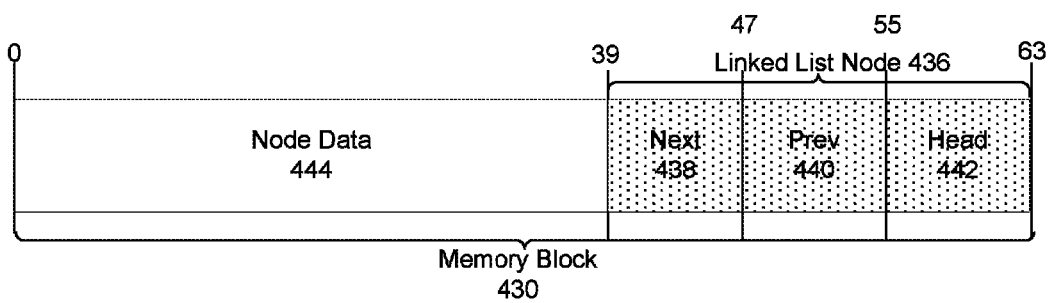
FIG. 4D illustrates a memory block of an allocation library with linked-list pointers marked as write protected according to one embodiment.

FIG. 4D illustrates a memory block 430 of an allocation library with linked-list pointers 438, 440, and 442 marked as write protected according to one embodiment. An object used in a programming language, such as C and C++, can be a linked list node 436. The linked list node 436 can include data as well as pointers 438, 440, and 442. The pointers can include a next pointer 438 pointing to a next node in a list of nodes, a previous pointer 440 pointing to a previous node in the list of nodes, and a head pointer 442 pointing to a first node in the list of nodes. An example of the linked list node 436 may be:

```
struct node {                                      (1)
    char[40] data;
    struct node* next; // Pointer to the next node
    struct node* prev; // Pointer to the previous node
    struct node* head; // Pointer to the first node
}
```

In one example, the data can be accessible to a user, such as for loading and/or storing data, and the pointers 438, 440, and 442 can be write protected. In another example, the pointers 438, 440, and 442 can be written or changed upon creation of new nodes and deletion of old nodes and can be read or traversed at any time. The memory block 430 can be a while node with a node data field 444 that includes node data.

Figure 4E:
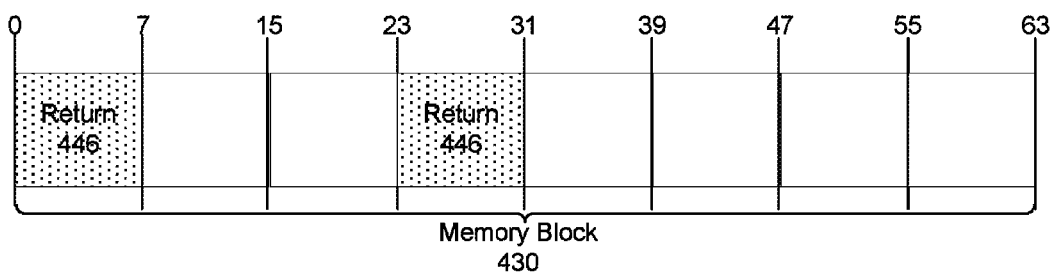
FIG. 4E illustrates a memory block of an allocation library with return addresses marked as write protected according to one embodiment.

FIG. 4E illustrates a memory block 430 of an application's stack with return addresses 446 marked as write protected according to one embodiment. When a function may be called during a run-time of an application, the caller's return address 446 can be stored in a defined location on a stack. To prevent a user or a malicious attacker from modifying the return address 446, the return address 446 can be set as write protected. The return address 446 can be set as write protected by a compiler of the MCD system inserting write protection instructions. The write protection instructions can be reset when the function may be returned and/or when the stack may be unwound, e.g. during code exceptions. An advantage of write protecting the return address 446 can be to protect a starting point for many malicious attacks.

Figure 5:
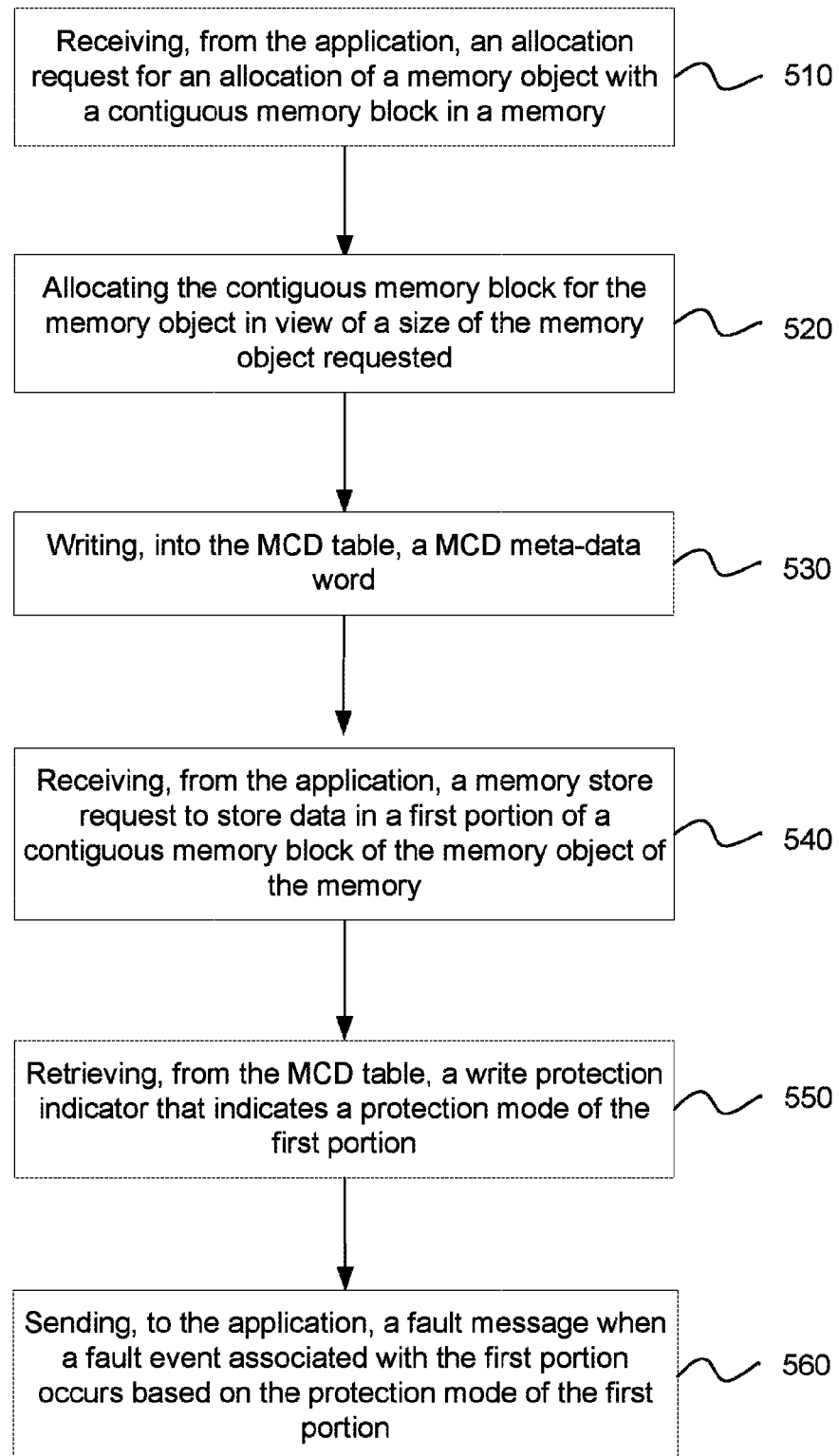
FIG. 5 depicts a flow diagram of a method for write protecting a portion of a memory block according to one embodiment.

FIG. 5 depicts a flow diagram of a method 500 for write protecting a portion of a memory block according to one embodiment. Method 500 may be performed by a computer system that may comprise hardware (e.g., circuitry, dedicated logic, and/or programmable logic), software (e.g., instructions executable on a computer system to perform hardware simulation), or a combination thereof. Method 500 and/or each of its functions, routines, subroutines, or operations may be performed by one or more physical processors of the computer system executing the method. Two or more functions, routines, subroutines, or operations of method 500 may be performed in parallel or in an order which may differ from the order described above. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

Referring to FIG. 5, the method 500 may begin with receiving, from the application, an allocation request for an allocation of a memory object with a contiguous memory block in a memory (block 510). The method can include allocating the contiguous memory block for the memory object in view of a size of the memory object requested (block 520). The method can include writing, into the MCD table, a MCD metadata word (block 530). The MCD metadata word can include a first MCD unique ID associated with the contiguous memory block and a write protection indicator that indicates a protection mode of a first portion of the contiguous memory block. The method can also include receiving, from the application, a memory store request to store data in a first portion of a contiguous memory block of the memory object of the memory (block 540). The memory store request can include a pointer indicating a first location of the first portion of the memory block to store the data. The method can include retrieving, from the MCD table, a write protection indicator that indicates a protection mode of the first portion (block 550). The method can include sending, to the application, a fault message when a fault event associated with the first portion occurs based on the protection mode of the first portion (block 560).

Figure 6:
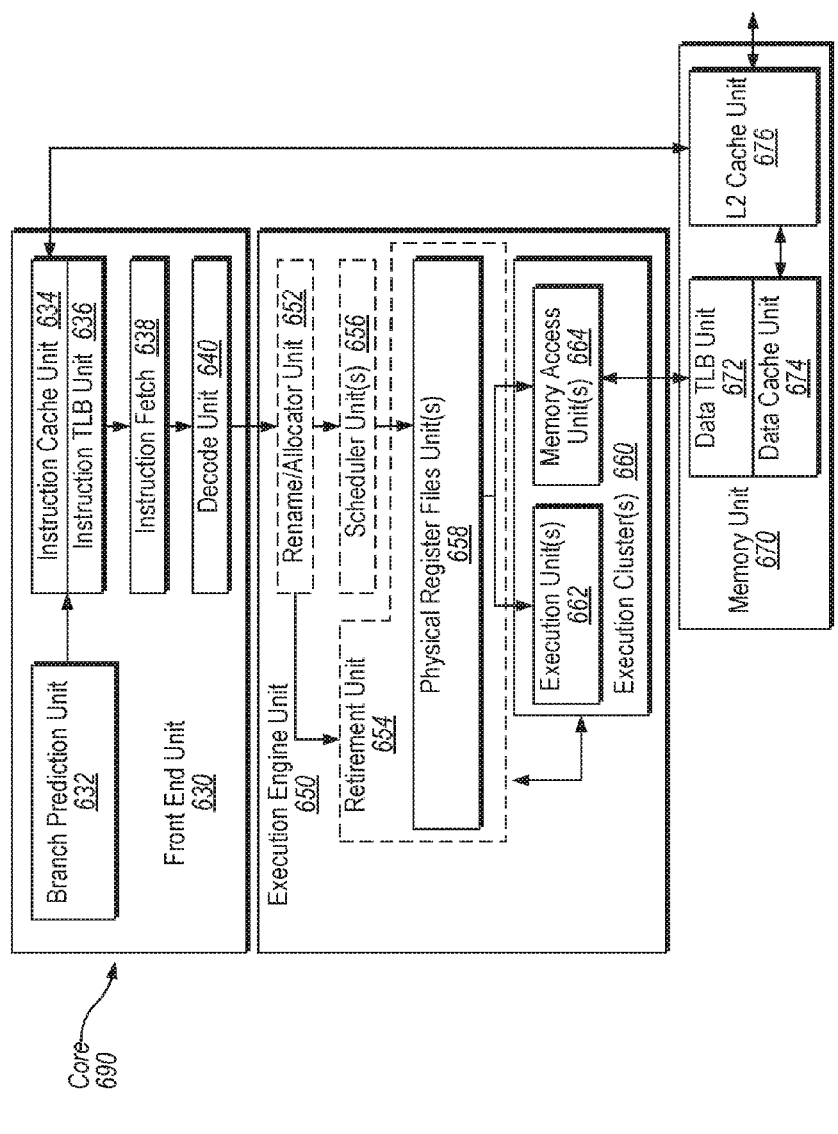
FIG. 6A is a block diagram illustrating an in-order pipeline and a register renaming stage, out-of-order issue/execution pipeline according to one embodiment.
FIG. 6B is a block diagram illustrating a micro-architecture for a processor that implements secure memory repartitioning according to one embodiment.

FIG. 6A is a block diagram illustrating a micro-architecture for a processor core 600 that may employ error correcting code to carry additional bits according to one embodiment. Specifically, processor core 600 depicts an in-order architecture core and a register renaming logic, out-of-order issue/execution logic to be included in a processor according to at least one embodiment of the disclosure. The embodiments of the error correcting code that carry additional bits may be implemented by processor core 600.

The processor core 600 includes a front end unit 630 coupled to an execution engine unit 650, and both are coupled to a memory unit 670. The processor core 600 may include a reduced instruction set computing (RISC) core, a complex instruction set computing (CISC) core, a very long instruction word (VLIW) core, or a hybrid or alternative core type. As yet another option, processor core 600 may include a special-purpose core, such as, for example, a network or communication core, compression engine, graphics core, or the like. In one embodiment, processor core 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the primary instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 may be coupled to the physical register file unit(s) 658. Each of the physical register file unit(s) 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 may be overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 may be coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor core 600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor core 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 690 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
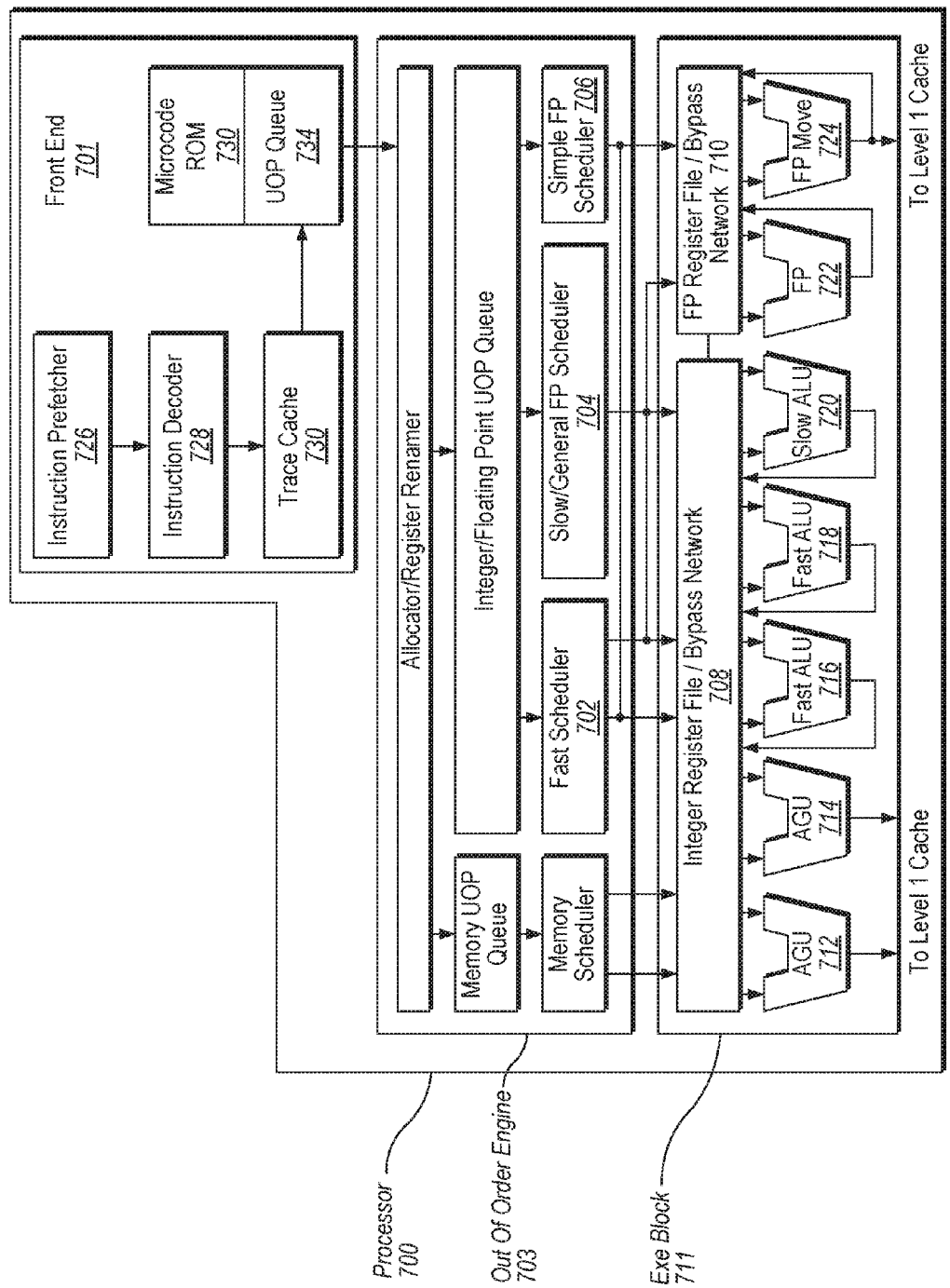
FIG. 7 illustrates a block diagram of the micro-architecture for a processor that includes logic circuits to perform secure memory repartitioning according to one embodiment.

FIG. 7 illustrates a block diagram of the micro-architecture for a processor 700 that includes logic circuits that may employ error correcting code to carry additional bits according to one embodiment. In some embodiments, an instruction in accordance with one embodiment may be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments that employ error correcting code to carry additional bits may be implemented by processor 700.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM (or RAM) 732 may provide the uops needed to complete the operation.

Some instructions are converted into a single micro-op, whereas others need several micro-ops to complete the full operation. In one embodiment, if more than four micro-ops are needed to complete an instruction, the instruction decoder 728 accesses the microcode ROM 732 to do the instruction. For one embodiment, an instruction may be decoded into a small number of micro ops for processing at the instruction decoder 728. In another embodiment, an instruction may be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment may schedule on each half of the main clock cycle while the other schedulers may only schedule once per main processor clock cycle. The schedulers arbitrate for the dispatch ports to schedule uops for execution.

Register files 708, 710, sit between the schedulers 702, 704, 706, and the execution units 712, 714, 716, 718, 720,722, 724 in the execution block 711. There is a separate register file 708, 710, for integer and floating point operations, respectively. Each register file 708, 710, of one embodiment also includes a bypass network that may bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point ALUs 722, 724, execute floating point, MMX, SIMD, and SSE, or other operations. The floating point ALU 722 of one embodiment includes a 64-bit-by-64-bit floating point divider to execute divide, square root, and remainder micro-ops. For embodiments of the present disclosure, instructions involving a floating point value may be handled with the floating point hardware.

In one embodiment, the ALU operations go to the high-speed ALUs 716, 718. The fast ALUs 716, 718, of one embodiment may execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, may be implemented to support a variety of data bits including 16, 32, 128, 256, etc. Similarly, the floating point units 722, 724, may be implemented to support a range of operands having bits of various widths. For one embodiment, the floating point units 722, 724, may operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
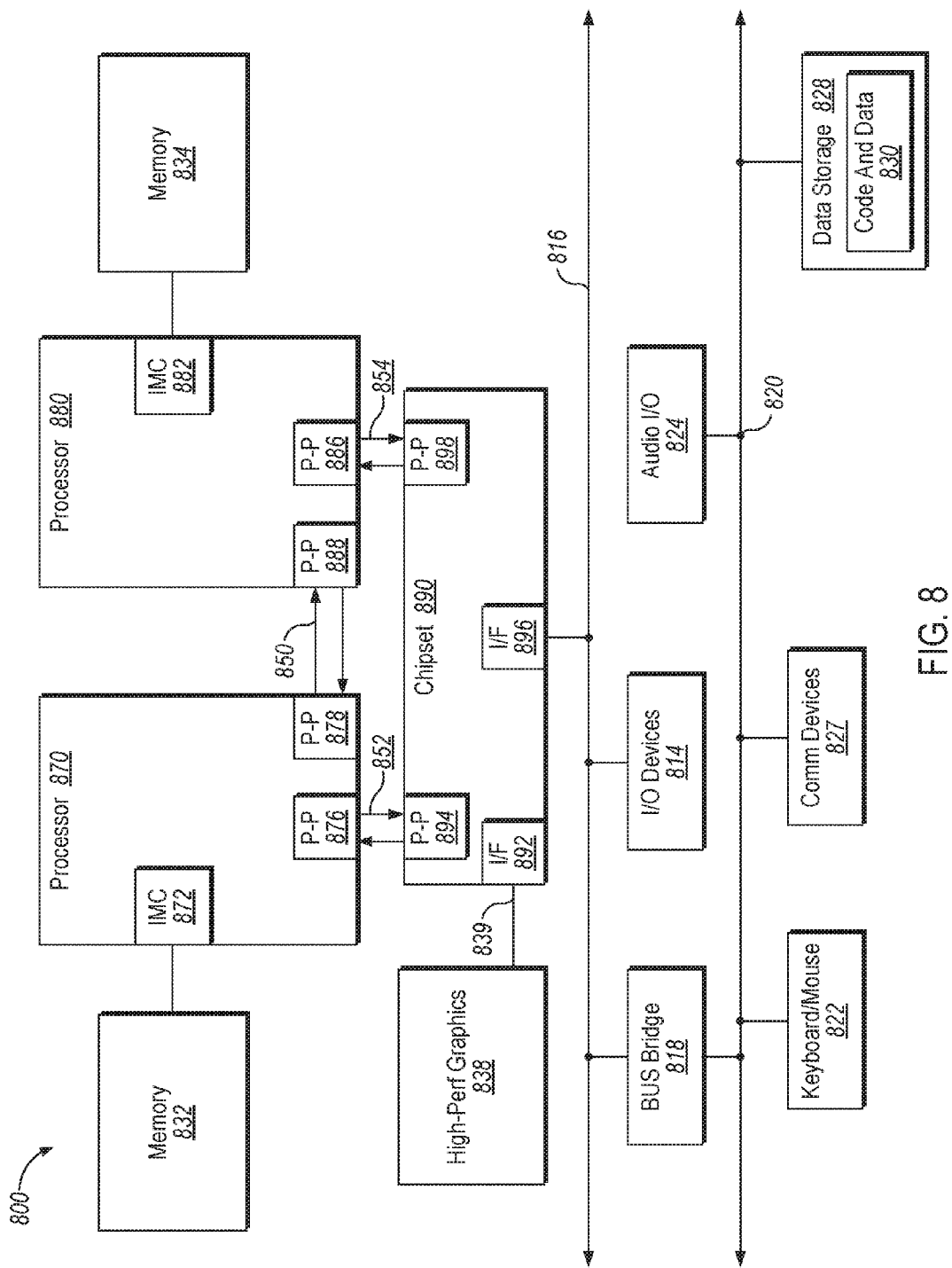
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. The embodiments that employ error correcting code to carry additional bits may be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interconnect 850 using P-P interfaces 878, 888. As shown in FIG. 13, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interconnects 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 11, a system may implement a multi-drop bus or other such architecture.

Figure 9:
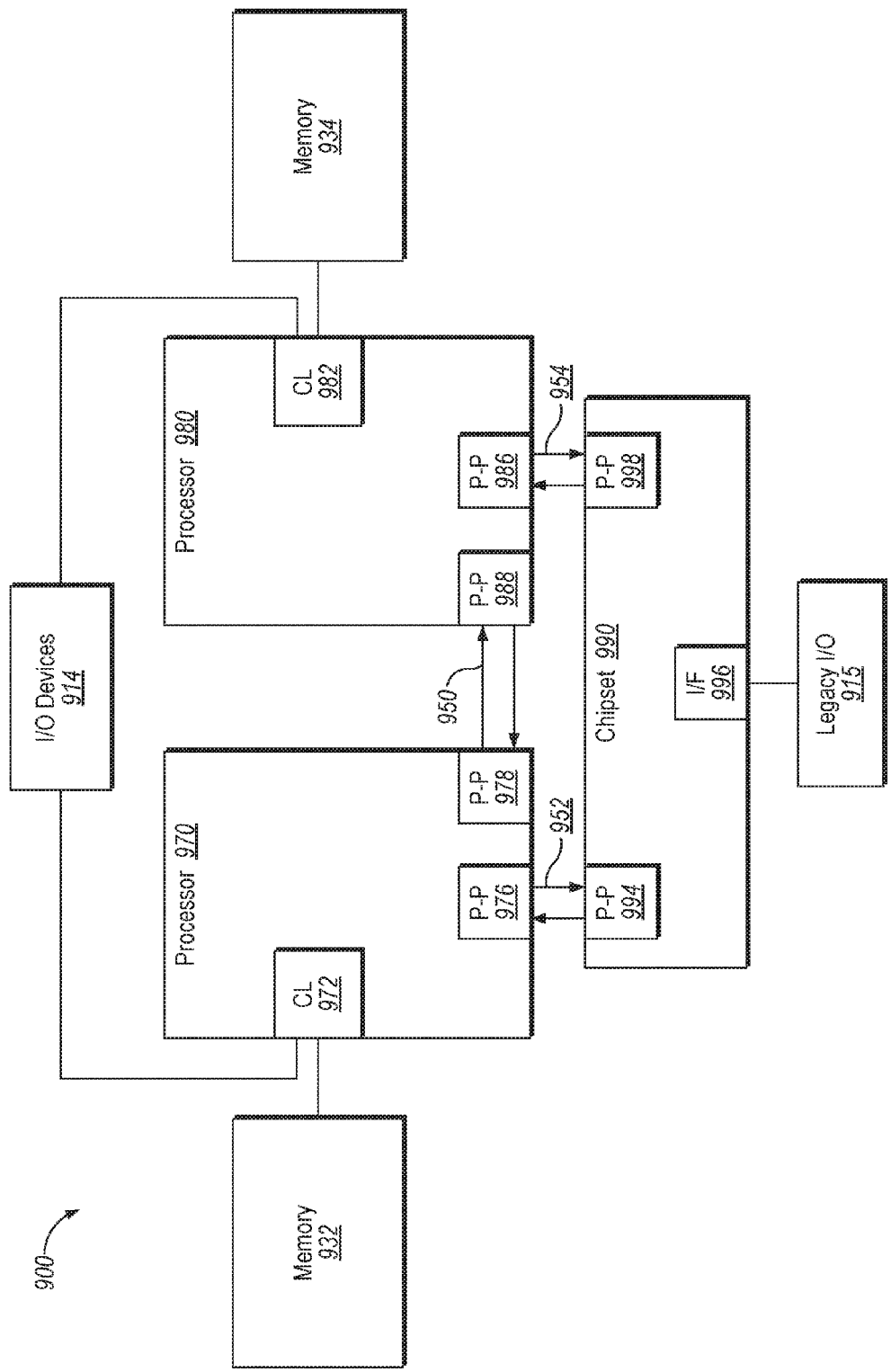
FIG. 9 is a block diagram of a computer system according to another implementation.

Referring now to FIG. 9, shown is a block diagram of a third system 900 in accordance with an embodiment of the present disclosure. Like elements in FIGS. 9 and 10 bear like reference numerals, and certain aspects of FIG. 9 have been omitted from FIG. 10 in order to avoid obscuring other aspects of FIG. 9.

FIG. 9 illustrates that the processors 970, 980 may include integrated memory and I/O control logic ("CL") 972 and 992, respectively. For at least one embodiment, the CL 972, 982 may include integrated memory controller units such as described herein. In addition, CL 972, 992 may also include I/O control logic. FIG. 9 illustrates that the memories 932, 934 are coupled to the CL 972, 992, respectively, and that I/O devices 914 are also coupled to the control logic 972, 992. Legacy I/O devices 915 are coupled to the chipset 990. The embodiments of that employ error correcting code to carry additional bits may be implemented in processor 970, in processor 980, or in both processors 970 and 980.

Figure 10:
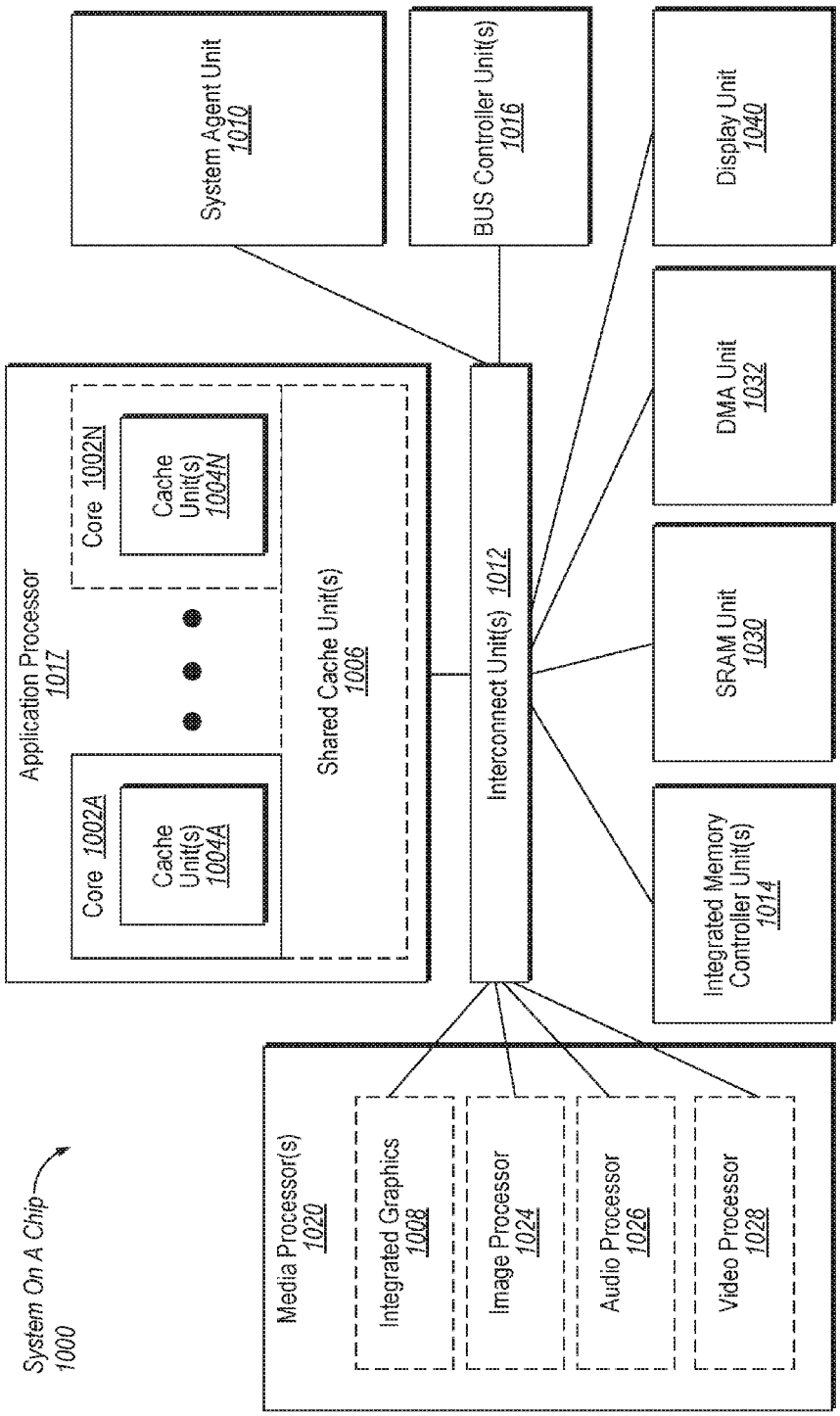
FIG. 10 is a block diagram of a system-on-a-chip according to one implementation.

FIG. 10 is an exemplary system on a chip (SoC) 1000 that may include one or more of the cores 1002A-1002N. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1000 of FIG. 10, dashed lined boxes are features on more advanced SoCs. An interconnect unit(s) 1012 may be coupled to: an application processor 1017 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
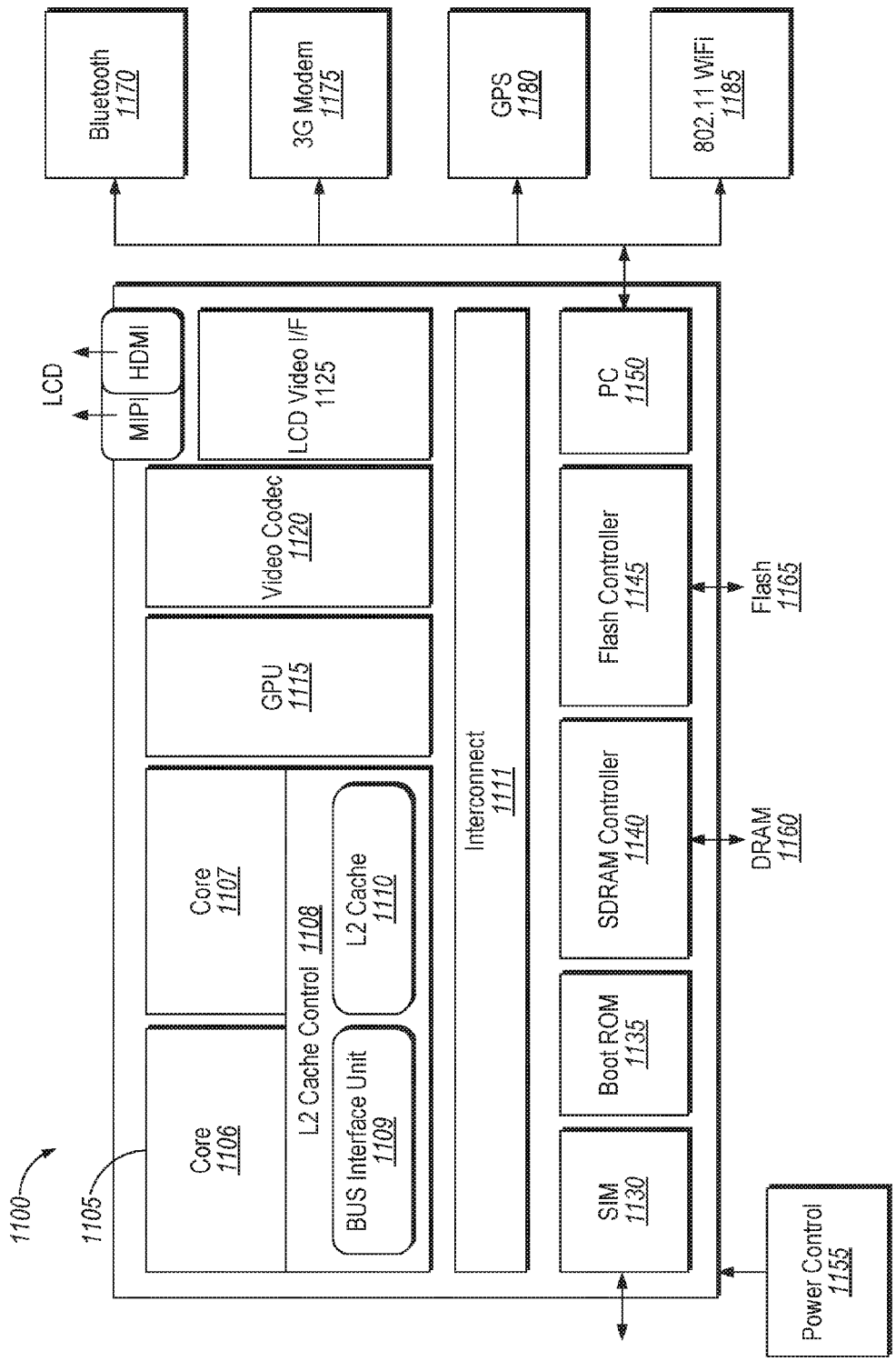
FIG. 11 illustrates another implementation of a block diagram for a computing system according to one implementation.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The embodiments that employ error correcting code to carry additional bits may be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which may implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
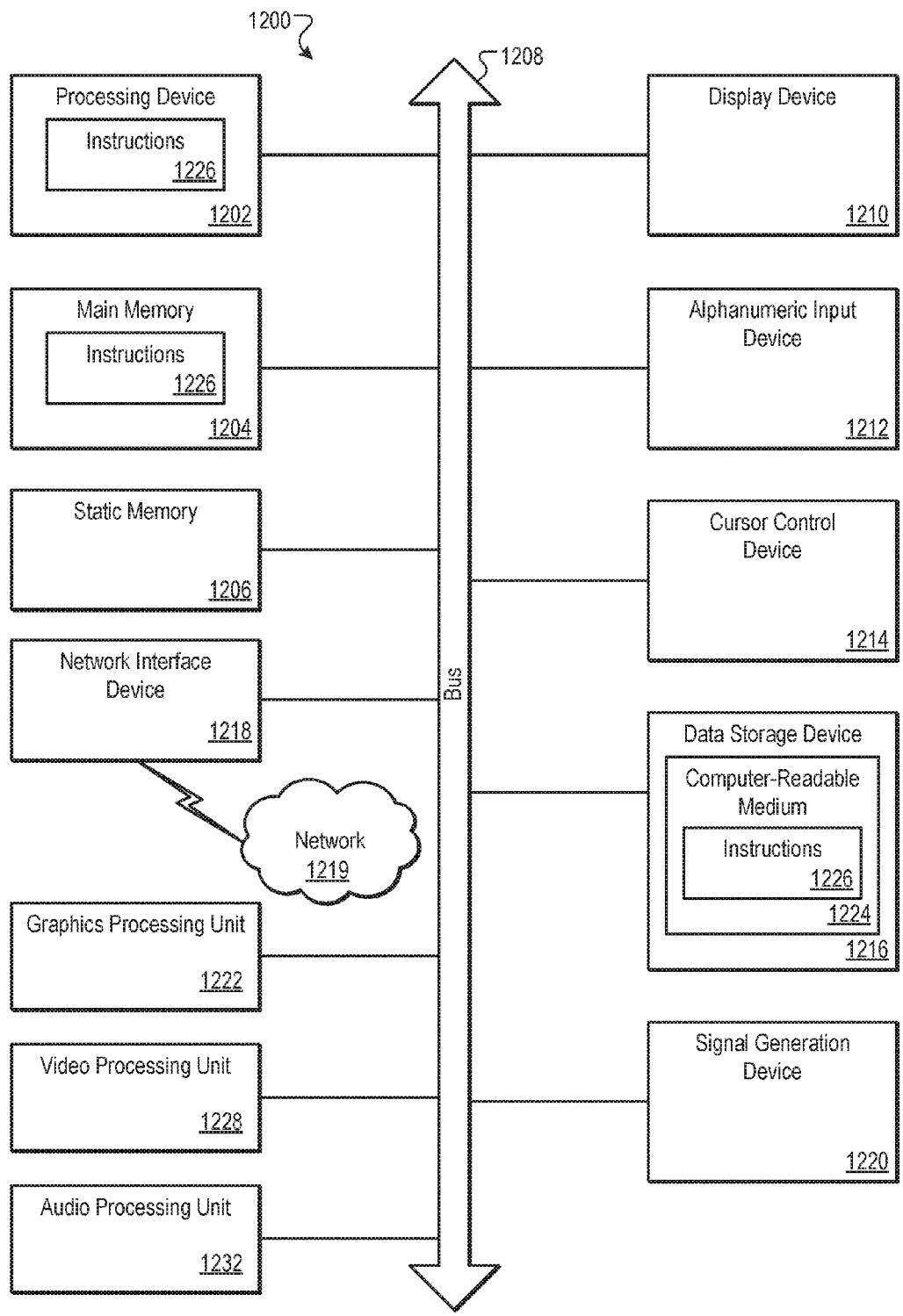
FIG. 12 illustrates another implementation of a block diagram for a computing system according to one implementation.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that employ error correcting code to carry additional bits may be implemented in computing system 1200.

The computing system 1200 includes a processing device 1202, main memory 1204 (e.g., flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1216, which communicate with each other via a bus 1208.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processor cores. The processing device 1202 is configured to execute the instructions 1226 for performing the operations discussed herein.

In one embodiment, the computing system 1200 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1218 communicably coupled to a network 1219. The computing system 1200 also may include a video display device 1210 (e.g., a liquid crystal display (LCD) or a cathode ray tube (CRT)), an alphanumeric input device 1212 (e.g., a keyboard), a cursor control device 1214 (e.g., a mouse), a signal generation device 1220 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1216 may include a computer-readable storage medium 1224 on which is stored instructions 1226 embodying any one or more of the methodologies of functions described herein. The instructions 1226 may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIGS. 1A, 1B, 1C and FIG. 2-7, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

In Example 1, is a processor, including: 1) a processor core comprising a register to store an address of a memory corruption detection (MCD) table, wherein the processing core is to: a) receive, from an application, an allocation request for allocation of a memory object with a contiguous memory block in memory; b) allocate the contiguous memory block for the memory object in view of a size of the memory object requested; c) write, into the MCD table, a MCD metadata word, wherein the MCD metadata word comprises: i) a first MCD unique identifier (ID) associated with the contiguous memory block; and ii) a write protection indicator that indicates a first protection mode of a first portion of the contiguous memory block; d) receive, from the application, a memory store request to store data in the first portion of the contiguous memory block of the memory object of the memory, where the memory store request comprises a first pointer indicating a first location of the first portion in the memory block to store the data; e) retrieve, from the MCD table, the write protection indicator that indicates the first protection mode of the first portion; and f) send, to the application, a fault message when a fault event associated with the first portion occurs based on the first protection mode of the first portion.

In Example 2, the processing system of Example 1 the contiguous memory block comprises the first portion of the contiguous memory block and a second portion of the contiguous memory block, where: 1) the first protection mode is a write protection mode; and 2) a second protection mode of the second portion is a non-write protection mode.

In Example 3, the processing system of Examples 1-2 where the fault event associated with the first portion is an event where the processor core receives, from the application, a memory store request to write data to the first portion.

In Example 4, the processing system of Examples 1-3 where the first portion stores at least one of allocation metadata, linked-list pointers, or a return address of a function for a stack.

In Example 5, the processing system of Examples 1-4 where: 1) the memory store request further comprises: a) a second MCD unique ID; and b) a second pointer indicating a second location in the memory of the memory object; and 2) the processing core is further to: a) compare the first MCD unique ID to the second MCD unique ID; and b) write the data to the first portion when the first MCD unique ID matches the second MCD unique ID.

In Example 6, the processing system of Examples 1-5 where the processing core is further to send the fault message when the first MCD unique ID does not match the second MCD unique ID.

In Example 7, the processing system of Examples 1-6 where the contiguous memory block is 64 bytes in size.

In Example 8, the processing system of Examples 1-7 where the MCD metadata word comprises a first byte and a second byte, and where: 1) the first byte comprises: the first MCD unique ID, a mode indicator of the second byte, and a reserved bit; and 2) the second byte comprises byte level granularity detection information and the write protection indicator.

Various embodiments may have different combinations of the structural features described above. For instance, all optional features of the processors and methods described above may also be implemented with respect to a system described herein and specifics in the examples may be used anywhere in one or more embodiments.

In Example 9, is a processing system, including: 1) a processor core comprising a register to store an address of a memory corruption detection (MCD) table, where the processing core is to: a) receive, from an application, a memory store request to store data in a first portion of a contiguous memory block of the memory object of a memory, where the memory store request comprises a first pointer indicating a first location of the first portion in the memory block to store the data; b) retrieve, from the MCD table, a write protection indicator that indicates a first protection mode of the first portion; and c) send, to the application, a fault message when a fault event associated with the first portion occurs based on the first protection mode of the first portion.

In Example 10, the processing system of Example 9 where the processing core is further to: 1) receive, from the application, an allocation request for an allocation of the memory object with the contiguous memory block in the memory; 2) allocate the contiguous memory block for the memory object in view of a size of the memory object requested; and 3) write, into the MCD table, a MCD metadata word, wherein the MCD metadata word comprises: a) a first MCD unique identifier (ID) associated with the contiguous memory block; and b) the write protection indicator that indicates the first protection mode of the first portion of the contiguous memory block.

In Example 11, the processing system of Examples 9-10 wherein: 1) the memory store request further comprises: a) a second MCD unique ID; and b) a second pointer indicating a second location in the memory of the memory object; and 2) the processing core is further to: a) compare the first MCD unique ID to the second MCD unique ID; and b) write the data to the first portion when the first MCD unique ID matches the second MCD unique ID.

In Example 12, the processing system of Examples 9-11 where the contiguous memory block comprises the first portion of the contiguous memory block and a second portion of the contiguous memory block, where: 1) the first protection mode of the first portion is a write protection mode; and 2) a second protection mode of the second portion is a non-write protection mode.

In Example 13, the processing system of Examples 9-12 where the fault event associated with the first portion is an event where the processor core receives, from the application, a memory store request to write data to the first portion.

In Example 14, the processing system of Examples 9-13 where the first portion stores at least one of allocation metadata, linked-list pointers, or a return address of a function for a stack.

Various embodiments may have different combinations of the structural features described above. For instance, all optional features of the processors and methods described above may also be implemented with respect to a system described herein and specifics in the examples may be used anywhere in one or more embodiments.

In Example 15, system on a chip (SoC) including: 1) a processor; 2) a memory device, coupled to the processor, to store data from an application, wherein the memory comprises a memory corruption detection (MCD) table and a memory object; and 3) a memory controller coupled to the memory device, the memory controller to: a) receive, from the application, an allocation request for an allocation of the memory object with a contiguous memory block in the memory; b) allocate the contiguous memory block for the memory object in view of a size of the memory object requested; and c) write, into the MCD table, a MCD metadata word with a write protection indicator that indicates a first protection mode of a first portion of the contiguous memory block.

In Example 16, the SoC of Example 15 wherein the memory controller is further to: 1) receive, from the application, a memory store request to store data in the first portion of the contiguous memory block of the memory object of the memory, where the memory store request comprises a first pointer indicating a first location of the first portion of the memory block to store the data; 2) retrieve, from the MCD table, the write protection indicator that indicates the first protection mode of the first portion; and 3) send, to the application, a fault message when a fault event associated with the first portion occurs based on the first protection mode of the first portion.

In Example 17, the SoC of Examples 15-16 where the contiguous memory block comprises the first portion of the contiguous memory block and a second portion of the contiguous memory block, where: 1) the first protection mode of the first portion is a write protection mode; and 2) a second protection mode of the second portion is a non-write protection mode.

In Example 18, the SoC of Examples 15-17 where the first portion stores at least one of allocation metadata, linked-list pointers, or a return address of a function for a stack.

In Example 19, the SoC of Examples 15-18 where the MCD metadata word comprises a first byte and a second byte, and where: 1) the first byte comprises: a MCD unique ID, a mode indicator of the second byte, and a reserved bit; and 2) the second byte comprises byte level granularity detection information and the write protection indicator.

In Example 20, the SoC of Examples 15-19 where the contiguous memory block is 64 bytes in size.

Various embodiments may have different combinations of the structural features described above. For instance, all optional features of the processors and methods described above may also be implemented with respect to a system described herein and specifics in the examples may be used anywhere in one or more embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to employing error correcting code to carry additional bits in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing system comprising:
a processor core comprising a register to store an address of a memory corruption detection (MCD) table, wherein the processing core is to:
receive, from an application, a memory store request to store data in a first portion of a contiguous memory block of a memory; and
send, to the application, a fault message when a fault event associated with the first portion occurs in view of a protection mode of the first portion, wherein the protection mode indicates that the first portion is write protected.

2. The processing system of claim 1, wherein the processing core is further to retrieve, from the MCD table, a write protection indicator that indicates the protection mode of the first portion.

3. The processing system of a claim 2, wherein the write protection indicator is a MCD color value.

4. The processing system of a claim 3, wherein the MCD color value is a 6-bit metadata value.

5. The processing system of a claim 2, wherein the memory store request comprises a pointer indicating a first location of the first portion in the memory block to store the data, and wherein the write protection indicator is stored in a bit of the pointer.

6. The processing system of claim 2, wherein the write protection indicator includes a binary code, wherein a first binary number indicates the first portion is write protected and a second binary number indicates that the first portion is non-write protected.

7. The processing system of claim 1, wherein the contiguous memory block comprises the first portion of the contiguous memory block in the protection mode and a second portion of the contiguous memory block in a non-protection mode, wherein the protection mode is a write protection mode and the non-protection mode for the second portion is a non-write protection mode.

8. The processing system of claim 1, wherein the fault event associated with the first portion is an event where the processor core receives, from the application, the memory store request to write data to the first portion.

9. The processing system of claim 1, wherein the first portion stores at least one of allocation metadata, linked-list pointers, or a return address of a function for a stack.

10. The processing system of claim 1, wherein the processing core is further to:
receive, from the application, an allocation request for an allocation of a memory object with the contiguous memory block in the memory;
allocate the contiguous memory block for the memory object in view of a size of the memory object requested; and
write, into the MCD table, a MCD metadata word.

11. The processing system of claim 10, wherein the memory store request comprises:
a first pointer indicating a location of the first portion in the memory block to store the data, wherein the first pointer includes a first MCD unique ID; and
a second pointer indicating a location of the memory object with the contiguous memory block, wherein the second pointer includes a second MCD unique ID, and wherein the processing core is further to write the data to the first portion when the first MCD unique ID matches the second MCD unique ID.

12. The processing system of claim 11, wherein the processing core is further to send the fault message when the first MCD unique ID does not match the second MCD unique ID.

13. A system on a chip (SoC) comprising:
a memory device to store data from an application, wherein the memory device comprises a memory corruption detection (MCD) table; and
a memory controller coupled to the memory device, the memory controller to:
allocate a contiguous memory block in the memory; and
write a MCD word into the MCD table, wherein the MCD word includes a write protection indicator that indicates a protection mode of a first portion of the contiguous memory block, wherein the protection mode indicates that the first portion is write protected.

14. The SoC of claim 13, wherein the MCD word comprises:
a first byte includes a first MCD unique ID and a mode indicator of a second byte; and
the second byte comprises byte level granularity detection information and the write protection indicator.

15. The SoC of claim 13, wherein the memory controller is further to receive, from the application, an allocation request for an allocation of a memory object in the contiguous memory block.

16. The SoC of claim 13, wherein the contiguous memory block comprises:
the first portion of the contiguous memory in the protection mode; and
a second portion of the contiguous memory in a non-protection mode.

17. A processing system comprising:
a processor core comprising a register to store an address of a memory corruption detection (MCD) table, wherein the processing core is to:
write a word into the MCD table, wherein the word comprises a write protection indicator that indicates a protection mode of a first portion of a contiguous memory block in a memory;

receive, from an application, a memory store request to store data in the first portion of the contiguous memory block; and send, to the application, a fault message when a fault event associated with the first portion occurs in view of the protection mode of the first portion of the contiguous memory block, wherein the protection mode indicates that the first portion is write protected.

18. The processing system of claim 17, wherein the fault event associated with the first portion is an event where the processor core receives, from the application, the memory store request to write data to the first portion.

19. The processing system of claim 17, wherein the contiguous memory block is 64 bytes in size.

20. The processing system of claim 17, wherein the contiguous memory block comprises:

the first portion of the contiguous memory block, wherein the first portion is in a write protection mode; and a second portion of the contiguous memory block, wherein the second portion is in a non-write protection mode.

* * * * *